(12) United States Patent
Vilato et al.

(10) Patent No.: US 7,449,244 B2
(45) Date of Patent: Nov. 11, 2008

(54) PLATE MADE OF A GLASS MATERIAL FOR A DEVICE OF THE FIREPLACE INSERT OR STOVE TYPE

(75) Inventors: Pablo Vilato, Paris (FR); Mieke Nelson, Greer, SC (US); Atticus Rutledge, Simpsonville, SC (US)

(73) Assignee: Eurokera S.N.C., Chateau-Thierry (FR)

( * ) Notice: Subject to any disclaimer, the term of this patent is extended or adjusted under 35 U.S.C. 154(b) by 0 days.

(21) Appl. No.: 10/947,391

(22) Filed: Sep. 23, 2004

(65) Prior Publication Data

US 2006/0024509 A1 Feb. 2, 2006

(30) Foreign Application Priority Data

Jul. 30, 2004 (FR) .................. 04 51744

(51) Int. Cl.
*F24B 1/192* (2006.01)
*F24B 13/00* (2006.01)

(52) U.S. Cl. ............. 428/432; 126/500; 126/502; 126/520; 126/544; 359/580; 359/582; 359/585; 359/586; 428/426; 428/433; 428/434; 428/469; 428/472

(58) Field of Classification Search ........... 126/500, 126/520, 502, 544; 428/426, 432, 457, 469; 428/472, 434, 433; 359/580, 582, 585, 586
See application file for complete search history.

(56) References Cited

U.S. PATENT DOCUMENTS

| | | | | |
|---|---|---|---|---|
| 3,799,653 | A * | 3/1974 | Ikeda | 359/588 |
| 3,971,869 | A * | 7/1976 | Gelber et al. | 428/195.1 |
| 4,045,125 | A * | 8/1977 | Farges | 359/585 |
| 4,048,978 | A * | 9/1977 | Plumat et al. | 126/200 |
| 4,188,452 | A * | 2/1980 | Groth | 428/336 |
| 4,450,201 | A * | 5/1984 | Brill et al. | 428/336 |
| 4,455,479 | A | 6/1984 | Itoh et al. | |
| 4,667,607 | A | 5/1987 | Fleming | |
| 4,721,877 | A * | 1/1988 | Kawakatsu et al. | 313/111 |
| 4,921,331 | A * | 5/1990 | Nakajima | 359/584 |
| 5,700,305 | A * | 12/1997 | Lowe et al. | 427/162 |
| 5,983,890 | A * | 11/1999 | Thomas et al. | 126/512 |
| 6,024,084 | A | 2/2000 | Gerhardinger et al. | |
| 6,060,178 | A * | 5/2000 | Krisko | 428/433 |
| 6,362,303 | B1 * | 3/2002 | Byker et al. | 528/76 |
| 2002/0037414 | A1 * | 3/2002 | Cunningham | 428/412 |
| 2003/0066825 | A1 | 4/2003 | Leutner et al. | |

FOREIGN PATENT DOCUMENTS

EP  0 780 640 A2  6/1997
FR  2 845 774     2/2000

OTHER PUBLICATIONS

Internet website: http://optics.mellesgriot.com/opguide/mp_3_4.htm.*
CRC Handbook of Chemistry and Physics; 61st Edition; 1980-1981, p. B143.*

* cited by examiner

*Primary Examiner*—Archene Turner
(74) *Attorney, Agent, or Firm*—Oblon, Spivak, McClelland, Maier & Neustadt, P.C.

(57) ABSTRACT

The invention relates to a plate for fireplace insert or stove, or equivalent, formed from at least one substrate made of a glass material comprising at least one reflective coating on at least one of its faces. The invention also relates to the process for manufacturing the plate and to the device that includes said plate.

17 Claims, No Drawings

PLATE MADE OF A GLASS MATERIAL FOR A DEVICE OF THE FIREPLACE INSERT OR STOVE TYPE

The present invention relates to an element, generally a front-facing element, for a heating device, in particular a plate made of a glass material intended to fit into an apparatus of the type of a fireplace or fireplace insert, a stove, a boiler, a cooker, a heating appliance, an hearth or equivalent.

Apart from open-hearth fireplaces, novel types of heating appliances having an essentially esthetic and/or functional character have been developed over the last few decades, such as fireplace insert hearths or inserts, or novel types of stoves that are easy to install and service, which meet many requirements especially in terms of comfort and safety. To profit from the pleasure associated with looking at burning hearths within these devices, they are generally fitted with a window, facing the front of the device, usually incorporated into a door allowing access to the hearth and conventionally made of a glass material; in an open-hearth fireplace, the protection provided by this window or door may be ensured at the same time by a fire screen that may also be made of a glass material.

In stoves or fireplace inserts in particular, for the sake of safety or ease of use, it is also becoming more and more frequent to replace conventional wood-burning heating systems with more sophisticated heating systems that incorporate ducts or circuits for the supply of fuel and/or the circulation of air; however, these ducts and circuits may appear somewhat unattractive when they are not concealed by the flames when these devices are not in operation.

The object of the present invention is therefore to propose a novel heating device of the fireplace insert or stove type or equivalent, which is both esthetically attractive and functional whilst still complying with the requirements existing in this field. In particular, the present invention has developed a plate made of a glass material which is suitable for use in a face of this type of device and meets the objectives thus defined, in particular making it possible to preserve the attractive visual appearance of the burning hearth of these devices, whilst masking any unattractive internal structure of said hearths when not burning, the difficulty of implementing this type of product being especially associated with the stringent resistance requirements, particularly temperature resistance, of this type of product and also with the a priori existing in terms of combining materials of different characteristics subjected to such particularly severe operating conditions.

This object has been achieved by the plate according to the invention formed from at least one substrate made of a glass material, comprising at least one reflective coating on at least one of its faces. Advantageously, the plate formed from at least one substrate made of a glass material is a glass-ceramic plate.

The reader is reminded that a glass-ceramic is originally a glass, called precursor glass, the specific chemical composition of which makes it possible to induce, by suitable "ceramization" heat treatments, a controlled crystallization. This specific partly crystallized structure gives the glass-ceramic unique properties. However, it is very tricky to make modifications to these plates and/or to their manufacturing process without the risk of unfavorably affecting the desired properties; in particular, it had never been envisioned to add a reflective coating to this type of material in the type of application presently envisioned, especially because of the risks of degrading such a coating, in particular considering the different expansion coefficients of these types of material and the risk of crazing owing to the frequency of the envisioned heat shocks.

Surprisingly, the present invention has shown that such a combination is possible and advantageous.

The present invention also relates to a device of the fireplace insert or stove type or equivalent, this device comprising at least one plate according to the present invention. This plate is preferably on the front face of the device, for example incorporated into a door allowing access to the hearth, or incorporated into the structure as a window, or optionally removable, notably in the case of a plate coupled to the hearth in the manner of a fire screen.

The present invention also relates to a process for manufacturing said plate, which includes a step of depositing at least one reflective coating on the glass substrate.

The term "glass-ceramic plate" is understood hereafter to mean not only plates made of glass-ceramic proper, but also plates made of any other similar material resistant to high temperature and having a zero or almost zero expansion coefficient (for example less than $15 \times 10^{-7} K^{-1}$). However, it is preferred to be a plate made of glass-ceramic proper.

Combining the reflective coating with the substrate made of a glass material, in particular with a glass-ceramic substrate, has the advantage of more or less concealing the hearth when it is not burning, while allowing the fire to be seen when in operation. The plate according to the invention also meets the requirements that are demanded in this type of application; in particular, it has a temperature resistance (especially no degradation and delamination) of at least 500° C., preferably at least 600° C., particularly preferably at least 650° C., or even 700° C. depending on the coating selected. The plate according to the invention also exhibits good resistance to the risks of scratching or impacts.

Preferably, the coating is on the external face of the plate, that is to say the face designed to be turned toward the outside of the heating device, this face not being in direct contact with the fire during operation of the device.

Also preferably, the plate according to the invention (having the reflective coating as defined) has a light reflection $R_L$ (in the visible wavelength range—integrated between 0.38 µm and 0.78 µm—under illuminant $D_{65}$) of between 20 and 80%, particularly preferably between 30 (or even 40) and 70%. It also preferably has a light transmission $T_L$ of between 10 and 78% (in the visible wavelength range—integrated between 0.38 µm and 0.78 µm—under illuminant $D_{65}$).

Preferably, the substrate forming the plate is transparent and particularly has at least one light transmission $T_L$ greater than 70%, particularly preferably greater than 80%. Optionally, it may be bulk-tinted, or decorated, for example with enamel. The use of what is called a translucent substrate, or even an opaque substrate, may also be envisioned; however, in this case the visibility of the burning fire may be reduced.

The coating may be in the form of one or more layers. Advantageously, it comprises at least one layer of the metallic type and/or at least one layer based on a dielectric material.

According to a first embodiment, the coating is for example a monolayer coating based on a dielectric material with a high refractive index n, i.e. one greater than 1.8, preferably greater than 1.95, or particularly preferably greater than 2, for example a monolayer of $TiO_2$ or $Si_3N_4$ or TiN, etc.

According to a second embodiment, the coating comprises at least one metallic (or essentially metallic) layer, preferably protected (coated on at least one face and advantageously on its two opposed faces) by at least one layer based on a dielectric material, for example it comprises at least one silver or aluminum layer coated for example with at least one protective layer made of $Si_3N_4$ (in particular an $Si_3N_4$/metal/$Si_3N_4$ multilayer) or made of $SiO_2$.

In a third particularly advantageous and preferred embodiment according to the invention, the coating is formed from a thin-films multilayer (or pile) based on dielectric material with a high refractive index (preferably greater than 1.8 or 1.95 or even 2, as explained above) alternating with dielectric material with a low refractive index (preferably less than 1.65), especially materials of the metal oxide (or metal nitride or oxynitride) type, such as $TiO_2$ and $SiO_2$ or a mixed (tin-zinc, zinc-titanium, silicon-titanium, etc.) oxide or alloy, etc., the layer which is deposited last and therefore being on the external face of the plate being a layer with a high refractive index.

As a layer material with a high refractive index, mention may be made, for example, of $TiO_2$ or possibly $SnO_2$, $Si_3N_4$ $Sn_xZn_yO_z$, $TiZnO_x$ or $Si_xTi_yO_z$, $ZnO$, $ZrO_2$, $Nb_2O_5$, etc. As layer material with a low refractive index, mention may be made for example of $SiO_2$, or possibly a silicon oxynitride and/or oxycarbide, or a mixed silicon aluminum oxide, or a fluorocompound, for example of the $MgF_2$ or $AlF_3$ type, etc.

Preferably, the multilayer is one comprising at least three layers, the desired reflection taking place by the combined action of the various layers of the multilayer, the layer closest to the substrate being a layer with a high refractive index, the intermediate layer being a layer with a low refractive index, and the outer layer being a layer with a high refractive index. Preferably, the multilayer is one comprising the following alternation of oxide layers: (substrate)—$TiO_2/SiO_2/TiO_2$.

Preferably, the (geometrical) thickness of the coating is between 20 and 1000 nm (the thickness of the substrate generally being a few millimeters, especially between 3 and 6 mm, and usually about 4 mm in the case of a glass-ceramic substrate). In the case of coating formed from several layers (generally in the form of a multilayer), the thickness of each of the layers may vary between 5 and 160 nm, generally between 20 and 150 nm.

For example in the case of the preferred $TiO_2/SiO_2/TiO_2$ multilayer according to the invention, in a first embodiment, the thicknesses of these layers are a few tens of nanometers (for example around 60-80 nm) for each of the respective $TiO_2$ and $SiO_2$ layers, the coating having in this case a silver appearance, and in a second embodiment the thicknesses of the $TiO_2$ layers are of the same order as above but the thickness of the $SiO_2$ layer is twice as great (for example around 130-150 nm), the coating in this case having a gold appearance.

The plate may also be provided with a coating having another type of functionality, possibly coupled with that desired according to the invention (without this additional functionality being to the detriment of the desired properties) but more generally on the opposed face, such as a coating with a low-emissivity function (for example made of a doped metal oxide such as $SnO_2$:F or ITO tin-doped indium oxide, or aluminum-doped zinc oxide ZnO:Al), favoring pyrolysis of the soot that may be deposited on the inside of the hearth, or a coating made of $SiO_2$ forming a barrier against the sulfur contained in the combustion gases.

The plate may be surrounded by a frame and/or have free edges that are generally shaped (rounded, beveled, etc.). It is generally flat but may also be curved, or may have deformations or folds.

The subject of the invention is also a process for manufacturing a plate according to the invention. As a reminder, the manufacture of glass-ceramic plates generally takes place as follows: the glass or chosen composition which is to form the glass-ceramic is melted in a melting furnace, the molten glass is then rolled into a standard ribbon or sheet by making the molten glass pass between rolling rolls and the glass ribbon is cut to the desired dimensions. The plates thus cut undergo a known ceramization process, the ceramization consisting in firing the plates according to the thermal profile selected for converting the glass into the polycrystalline material called "glass-ceramic" which has a zero or almost zero expansion coefficient and which withstands a heat shock possibly up to 700° C. The ceramization generally comprises a step of progressively raising the temperature up to the nucleation range, generally lying close to the glass transformation range, a step of passing for several minutes through the nucleation interval, a new step of progressively raising the temperature up to the ceramization hold temperature, the hold at the ceramization temperature for several minutes, followed by rapid cooling down to room temperature.

Optionally, the process may also include a step of forming the plate (possibly carried out at various moments during the operation mode mentioned above, provided that the material constituting the plate is at a high enough temperature to allow the plastic deformation thereof), which consists for example of a collapsing, molding or pressing operation (by rolling or by another operation) or bending operation, the ceramization of the plate generally taking place subsequent to the forming operation.

The process generally includes a cutting operation, for example using water jets, optionally followed by a shaping operation (grinding, beveling, etc.). The plate may also undergo other operations during its manufacture (for example, screen printing for esthetic or indicating purposes, the screen printing preferably taking place before the ceramization so as to allow, where appropriate, the baking of the enamel during said ceramization, etc.), and it may be provided with added elements, such as handles, etc.

The coating is applied to the plate, generally after ceramization, in line therewith, or subsequently thereafter (for example after said plate has been cut and/or shaped). The coating may be applied in particular by pyrolysis (powder, liquid or gas), by evaporation or by sputtering. Preferably, the coating is deposited by sputtering and/or by a vacuum and/or plasma-enhanced deposition method; in particular, the method of depositing the layer(s) by (cathodic) sputtering (for example magnetron sputtering), especially magnetically enhanced sputtering (and with a DC or AC current), is used, the oxides or nitrides being deposited from one or more appropriate metal or alloy or silicon or ceramic targets, if necessary under oxidizing or nitriding conditions (argon/oxygen or argon/nitrogen mixtures, where appropriate). It is also possible to deposit, for example, the oxide layers by reactive sputtering of the metal in question in the presence of oxygen and the nitride layers in the presence of nitrogen. To produce the $SiO_2$ or $Si_3N_4$, a silicon target may be used which is slightly doped with a metal such as aluminum in order to make it sufficiently conductive. The layer or layers selected according to the invention condense on the substrate in a particularly uniform manner, without any separation or delamination occurring.

In general, the coating is a continuous coating, however it is not excluded to add an additional esthetic effect by adding the coating in the form of a discontinuous coating, for example in the form of a grid or a pattern (preferably having a high covering ratio, especially one greater than 50% or greater than 75%), using suitable masks, for example made of perforated sheet metal. If the coating comprises several layers, the layers are deposited successively one after the other.

The subject of the present invention is also an apparatus (or device) for manufacturing a glass-ceramic plate as defined above, comprising at least one sputtering, pyrolysis or evaporation coater.

In particular, the plates according to the invention may advantageously be used to produce a new range of fireplace inserts or hearths or other equivalent heating devices.

The invention claimed is:

1. A plate for a fireplace insert or stove, or equivalent, formed from at least one substrate made of a glass-ceramic plate having a temperature resistance of at least 500° C. comprising at least one reflective coating which contacts the glass-ceramic plate on at least one of its faces;
   wherein the reflective coating is a monolayer coating based on a dielectric material having a refractive index greater than 1.8.

2. The plate as claimed in claim 1, wherein the refractive index of the dielectric material greater than 1.95.

3. The plate as claimed in claim 1, wherein the refractive index of the dielectric material greater than 2.

4. The plate as claimed in claim 1, wherein the dielectric material has a light reflection $R_L$ ranging from 20 to 80%.

5. A plate for a fireplace insert or stove, or equivalent, formed from at least one substrate made of a glass-ceramic plate having a temperature resistance of at least 500° C. and coated on and in contact with at least one of its faces with a reflective metallic layer which is protected with a layer of a dielectric material.

6. The plate as claimed in claim 5, wherein the layer is $Si_3N_4$ or $SiO_2$.

7. The plate as claimed in claim 5, wherein the layer is a three component structure of $Si_3N_4$/metal/$Si_3N_4$.

8. The plate as claimed in claim 5, wherein the at least one metallic layer is of silver or aluminum, and the at least one dielectric layer is of $Si_3N_4$.

9. The plate of claim 5, wherein the reflective metallic layer is coated with a layer of $Si_3N_4$ or $SiO_2$.

10. A plate for a fireplace insert or stove, or equivalent, formed from at least one substrate made of a glass-ceramic plate having a temperature resistance of at least 500° C. and coated on on the face of the plate facing outward from the fireplace insert or stove with at least one alternating combination of a dielectric material layer having a refractive index greater than 1.8 and a dielectric material layer having a refractive index less than 1.65, wherein the outermost layer of dielectric material is a dielectric material layer having a refractive index greater than 1.8.

11. The plate as claimed in claim 10, wherein the dielectric material having a refractive index greater than 1.8 is $TiO_2$, $SnO_2$, $Si_3N_4$, $Sn_xZn_yO_z$, $TiZnO_x$, $Si_xTi_yO_z$, $ZnO$, $ZrO_2$ or $Nb_2O_5$, and wherein the dielectric material having a refractive index less than 1.65 is $SiO_2$, silicon oxynitride and/or oxycarbide, a mixed silicon aluminum oxide or a fluorocompound.

12. The plate as claimed in claim 11, wherein the multilayer film is $TiO_2/SiO_2/TiO_2$.

13. The plate as claimed in claim 10, wherein the thickness of the coating ranges from 20 to 2000 nm.

14. A plate for a fireplace insert or stove, or equivalent, formed from at least one substrate made of a glass-ceramic plate having a temperature resistance of at least 500° C. comprising at least one reflective coating on on the face of the plate facing outward from the fireplace insert or stove;
   wherein the at least one reflective coating contacts the glass ceramic plate, and
   wherein the coating comprises, at least on the external surface thereof, a layer with a high refractive index.

15. A front-facing element for a fireplace insert or stove, comprising:
   at least one plate as claimed in claim 14.

16. A plate for a fireplace insert or stove, or equivalent, formed from at least one substrate made of a glass-ceramic plate having a temperature resistance of at least 500° C. comprising at least one reflective coating on the face of the plate facing outward from the fireplace insert or stove;
   wherein the at least one reflective coating contacts the glass ceramic plate, and
   wherein the coating is on that face intended to be turned toward the outside of the heating device.

17. A front-facing element for a fireplace insert or stove, comprising:
   at least one plate as claimed in claim 16.

* * * * *